April 5, 1932. J. B. TYTUS Re. 18,413
PROCESS OF ROLLING SHEETS
Original Filed July 3, 1925
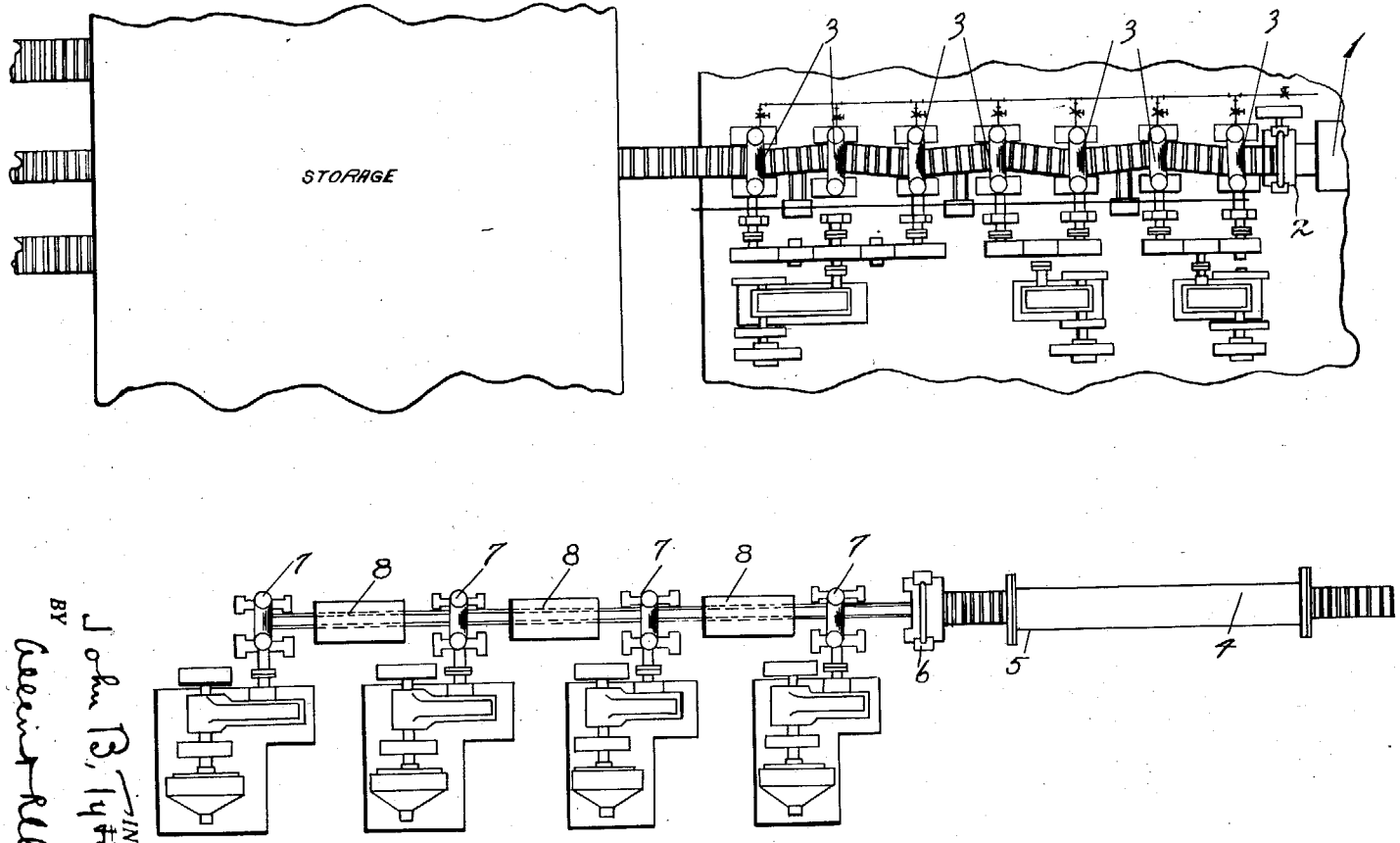
INVENTOR.
John B. Tytus
BY
Allen
ATTORNEYS Reissued Apr. 5, 1932 Re. 18,413

UNITED STATES PATENT OFFICE

JOHN B. TYTUS, OF MIDDLETOWN, OHIO, ASSIGNOR TO THE AMERICAN ROLLING MILL COMPANY, OF MIDDLETOWN, OHIO, A CORPORATION OF OHIO

PROCESS OF ROLLING SHEETS

Original No. 1,704,640, dated March 5, 1929, Serial No. 41,441, filed July 3, 1925. Application for reissue filed October 4, 1930. Serial No. 486,449.

My invention relates to processes for producing sheet metal in rolling mills, and deals with continuous processes, in which the metal is reduced by passing it between rolls under pressure, without re-rolling the piece or pack in any individual stand of rolls.

The elementary object of a continuous process of rolling, of the type defined, is to cut down labor costs by the reduction of the number of men employed. Thus for a mill which has a series of stands or rolls with the piece passing from one to the other fairly rapidly there is required but a single crew for the entire mill instead of a crew for each indivdual mill, and a much greater production in a given time.

Another feature of continuous processes of metal reduction in rolls, where economy is gained, is the time factor and labor factor in the matter of heating of the pieces or packs, in order to bring them to proper condition for roll treatment.

A brief outline of the Welsh system of rolling, as it is called, should first be given in order to properly express the novelty inherent in the invention which I design to cover in this application. The Welsh system of rolling involves the use of sheet bars, as a first step in sheet production, which bars are short lengths of a long bar, having a length equal to substantially the desired width of the final product. The sheet bars are heated to a proper degree, and are then given a rough rolling to reduce them to rough plate. Two bars are ordinarily used, and are passed in succession through a single stand of rolls, known as roughing rolls, until they have been lengthened sufficiently to make a satisfactory pack.

The pack is then heated sufficiently to receive subsequent rolling treatment, and the pieces when brought out of the furnace are placed one over the other and passed through a stand of finishing rolls, caught by operatives after each pass, and thrust back over the top of the stand for repeated passes.

When a required reduction in thickness is accomplished the pack may be doubled over on itself, and again heated, to the required degree, whereupon it is brought out of the furnace and given further passes through the finishing stand.

The final product is completed when the pack is long enough, less such rough ends as there may be, to fill the order being rolled.

A careful calculation is made in producing and cutting up the sheet bar, so that the cubic contents of the sheet bars used in an operation will equal the desired cubic contents of a finished pack.

There are variations of the Welsh process where more than two roughed-out bars are used for a pack, and packs are matched instead of doubling, which do not depart from the general practice outlined. The essential of the Welsh process is the use of a single stand of finishing rolls for all but the roughing out of the plate forming the pack, and the use of sheet bars, for forming the pieces in the rough pack, with such intermediate heating as may be required.

My invention involves the use of mills formed of a series of stands of rolls, through which hot pieces of a length and thickness suitable for a desired finished product are passed, but in which the original pieces are much longer than a sheet bar turned crosswise. The reason for this is that I have found it impractical to feed a piece as short as a sheet bar turned crosswise, through a mill operating on a piece in successive stands only, with rapid reduction in a number of passes at a single heating.

My invention also involves, as a natural consequence of using larger pieces to begin with, and the desire to cut down the required number of finishing passes on the packs, the production in the first stage of continuous rolling of individual pieces of considerable length as compared to rough plate used in forming packs.

These pieces are then matched and given a finishing treatment in pack form in another mill through which the packs move continuously in a single direction only.

I have found that with the use of the preliminary continuous reduction process, above noted, that means must be provided to deliver to the rolling mill, a rapid succession of pieces at uniform, correct temperature, and of accurately gauged solid contents and width. Such a means I provide.

It is not within the range of accuracy of a high speed continuous mill, however, to accomplish exactly the same attenuation or extension of each piece, although each piece will have the same solid contents.

It has been proposed a number of times in the prior art to provide a continuous process from bar to finished pack, but in all instances with which I am familiar, the designers of a proposed mill for the purpose have thought it necessary to provide for mechanical matching without stopping the progression of the pieces any more than required. On paper this would appear to result in a saving, but in matter of fact, it fails to take into consideration any inequalities there are in length of the roughed out pieces.

Thus it is part of my process to provide for storage and selection of pieces in the stage between the individual rolling and pack rolling. At this stage the continuity of the process is broken, which appears contrary to the teaching of the theoretical work of the past.

The enforced stop for selection enables me to have the packs for further treatment made up of pieces which approximate each other in length, thereby saving the likelihood of ruining a large number of packs in which there are different lengths of metal. The attempt to roll such improper packs will be without results because the several elements thereof require different treatment in spite of the fact that the solid contents of each element is the same.

Also the arrangement of a rolling plant for continuous treatment in which there is a stop for the product between the individual and the pack rolling, permits of processing the metal before finishing, which has been found to be quite desirable in some instances. The stoppage has still another advantage as it provides for an easy diverting point for orders of heavy gauges which do not require to be matched and rolled to thin sheets.

Thus as a detailed statement of object it may be stated that my objective is to provide a continuous process of rolling metal, beginning with a slab or bar which is wide and thick, and moving the pieces individually through successive passes in successive stands of rolls, then stopping the pieces and letting them cool, for purposes of selection, matching and pickling or other surface treatment, and having treated, selected and matched the individual pieces, to form packs of them and in a continuous manner to provide a finishing treatment to fine gauges.

The process of bringing the matched pieces or packs up to required uniform temperature for the finishing operation, it is my object to accomplish in a continuous manner, by moving the matched pieces, or the selected pieces which it is intended to make into packs, in a succession through a heating device which first brings the pieces or matched pieces or packs into the presence of a high heat, to rapidly bring them up to temperature, and then subject them to a temperature which is more nearly and desired final temperature in order to balance the effect given by the rapid heating, providing uniformly heated pieces.

Following this heating, it is my preferred object to finish the packs in a continuous manner by successive passes through successive finishing stands of rolls.

I accomplish my objects in part by the use of mechanical devices to act on the metal being used, and these I have illustrated in a preferred form in the drawing. In connection with a description of the drawing I will point out in more detail my invention, and will set forth in the appended claims the invention which appears inherent in my process.

In the drawing I show a single figure continued in several zones showing in diagrammatic fashion a mechanical arrangement suitable for carrying out my process.

It should be primarily noted that the heating device used at the start of my process covered herein, is shown and described in pending applications, as are the mills for treating individual pieces in a continuous manner. The general process from ingot to finished sheet is covered in other applications for process patents, and various mechanical devices shown or indicated, are also covered in pending applications.

Thus while it might not be required in any event to go into mechanical detail in illustrating and describing my invention, it will not be required in this particular instance due to the full disclosure of the various instrumentalities in copending applications.

I have illustrated a furnace 1, through which a long heated piece is passed into engagement with a shears 2. The shears is arranged to cut off exactly graded pieces which pass into the mill formed of the seven stands of rolls indicated at 3. The operation of this shears taken together with the width of the long piece, and the thickness thereof, provides the control for the complete operation. In other words a careful calculation is made to provide cut off pieces of uniform weight, i. e., each to have a uniform dimension throughout.

The pieces pass through the stands of rolls 3, which are run rapidly, and the pieces pass from one stand to another through the complete mill, without a reheating. The rolls are kept cool by means of water, and the stands are made as rigid as possible to permit of the desired reductions.

When the pieces are finished, they will ordinarily be of a length suitable for commercial purposes, as products now made in a so called jobbing mill.

The pieces when designed for subsequent further reduction in matched packs or doubled form, will be usually twice as long as the desired packs which will be used in the finishing mill or sheet mill.

The pieces originally cut off and fed into the first set of roll stands will be much longer than a sheet bar, turned sidewise, as in the roughing portion of the Welsh process, and the reduction carried on in the first mill or set of stands, will ordinarily be carried as far as practical without matching or doubling.

The product as it comes from the first mill is then moved into storage space, instead of being carried on a continuous table to the matcher and finishing mill.

During the storage period the pieces become cool, and may be pickled, or surface treated in any desired way. All pieces will be of practical uniform weight, but in spite of every precaution, they will be found to have unequal lengths. In this connection it should be noted that in a mill for continuous rolling such as I have shown at 3, those pieces which have a like length in any one run of material will have the same cross section. It will be apparent also that if a piece much longer than two packs is made on the mill 3, that it might vary, end for end, in which case the more attenuated ends will be treated as the longer ones of the single thickness pieces to which I have specifically referred.

After such surface treatment as is desired the operatives will sort the product which is to be used in the sheet mill, bringing pieces of like length together, and assembling the pieces for each order together, for running them through the sheet finishing process.

When sorted, it will be preferable to have the pieces matched, that is to say laid on top of each other in desired thicknesses and brought generally into co-ordinated position of superimposition, although this matching may be deferred until after heating, provided a succession is maintained of selected pieces suitable for matching because of having the same length. Also doubling could be practiced instead of matching, and I have used the word "pack" to refer to either.

Presuming a preliminary matching, the matched pieces may then be cut into the required length for packs, or this cutting may be postponed until after heating. It will be presumed that the cutting is done after heating.

In this instance the matched pieces are placed into a furnace having sections 4 and 5, of which the section 4 is subjected to a high heat to bring the pieces up rapidly in temperature, and the section 5 is subjected to a "soaking" heat approximately that at which it is desired to deliver the pieces to the first stand of the finishing mill.

The furnace will be provided with a conveying element, that moves the matched pieces along, so as to deliver the ends through the portion 5 of the furnace to a shears 6, that cuts up the matched pieces into packs.

As stated, the usual run of commercial orders and various features of the particular process described, will provide matched pieces of twice the length of the desired packs.

The packs will move from the shears, to the series of stands of rolls 7, with intermediate furnaces 8, which provide for a retention of proper temperature and maintenance of uniform temperature of the packs during the stages of reduction. These stands also may be kept cool by the use of water, or they may be run hot. There will be sufficient space between the roll stands and the furnace to permit operatives to manipulate the packs, thus keeping them from welding together, and correcting the line of movement, where required.

While some of the packs will be longer than others, due to the preliminary individual treatment, the final product may be the same, since all packs will be cut to have the same mass, or weight, and the shorter packs will require a greater reduction to bring them to the required finished gauge, and length. It is usual to provide more metal than called for by the order to allow for uneven ends on the packs, which have to be trimmed away.

While my process is designed particularly for use in continuous finishing mills, it would be of value in connection with use of the packs from the furnace 5, in individual stands of rolls, used as in the Welsh process, that reroll the same piece a number of times until it has reached the desired length, and hence gauge.

With the sorting step in the middle of the process, it is made possible for the men in control of the sheet mill, to be advised of the gauges of the packs furnished to them, and also of the contour of the packs.

As per my invention stated in other applications for patent, the contour of a pack is to be judged by the ratio of the thickness at the center to the thickness at the edges, and in order to provide a piece which will pass smoothy through each finishing stand, it is required that the adjustments, and various involved factors be controlled to the end of providing an active pass for the packs in each stand which has a contour less convex than the pack entering the pass.

With advance knowledge of the gauge and contour of packs being furnished to the multi-stand sheet mill, the roller can prepare in advance for such variations as occur, and following the contour principle just stated, can develop a technique which will result in a smooth rolling of the product furnished to him. Without this advance knowledge, however, such as may be obtained through a holding and selection of the product from which packs are made, it will be difficult for the roller to handle all packs as they come even in running through the same order.

It is not believed to be necessary to restate the process, as the directions as to how to proceed, the reasons for the procedure and a diagram of a mechanism for following out the preferred procedure have been given in the above matter.

Having thus described my invention, what I claim as new and desire to secure by Letters Patent, is:—

1. In a metal rolling process, the steps of providing a succession of thick pieces of uniform dimensions and mass and uniform heat, passing said pieces successively through a succession of stands of rolls to reduce them to long thin bodies in a single thickness, without reheating, permitting said thin bodies to cool and sorting them into like lengths, forming packs of the like lengths, providing for the packs to be heated by passing said packs, or the material from which to form said packs by means of a conveyor through a furnace at heat higher than desired for the packs, then through a furnace kept at a heat which is substantially that desired for the packs, and finally finishing said packs in successive relation, by passes through a succession of stands of rolls.

2. In a metal rolling process the steps of providing a succession of uniformly heated, uniform dimension thick metal pieces of substantial length, passing said pieces in succession through successive stands of rolls to reduce them without reheating to long thin bodies, permitting said bodies to cool, sorting them into like lengths without shearing, forming heated packs of more than one thickness of bodies of like length, shearing said packs to a desired length being of at the most half the length of the bodies from which they are made, and rolling said packs to finished gauge.

3. That metal rolling process which consists in forming long thin metal bodies by continuous roll action on pieces of a single thickness, permitting said pieces to cool, and sorting them into like lengths without shearing, forming heated packs of the like lengths, shearing said packs to a desired length being of at the most half the length of the bodies, and finally passing the heated packs through rolls for rolling them to finished gauge sheets.

4. That metal rolling process which consists in forming long thin metal bodies by continuous roll action on pieces of a single thickness, permitting said pieces to cool, and sorting them into like lengths without shearing, forming heated packs of the like lengths, shearing said packs to a desired length being of at the most half the length of the bodies, and finally passing the heated packs through rolls for rolling them to finished gauge, said heated packs being heated by raising the pieces thereof rapidly by exposure to an excess over required heat, and then normalizing the heat by subjection to a temperature substantially that desired for the finishing of the packs.

5. That metal rolling process which consists in providing a succession of thick pieces of substantial length, reducing the pieces by successive passes through successive stands of rolls, to long thin plate, permitting said plate to cool, surface treating the plate, as by cold rolling and pickling or both, forming packs from equal length unsheared pieces which are reheated to required temperature for finishing, and then rolling the packs to finished length and hence gauge.

6. That metal rolling process which consists in providing a succession of thick pieces of substantial length, reducing the pieces by successive passes through successive stands of rolls, to long thin plate, permitting said plate to cool, and sorting it into equal lengths without shearing, forming packs from equal length pieces which are reheated to required temperature for finishing, and then rolling the packs to finished length and hence gauge.

7. That sheet metal rolling process which consists in supplying the finishing mills with a series of packs formed from individual products rolled on other mills, each pack having a cross section which is alike to others in the run except where the roller is preadvised.

8. That process of rolling sheet metal which consists in forming a series of packs, each having a known cross section of which the next roller is advised, heating and hot rolling said packs.

9. That process of rolling sheet metal which consists in rolling thin plate sections by continuous process in single thicknesses, and from these thin plate sections forming packs of substantially the same cross section for a given run of which the next roller is advised, and finally hot rolling said packs, whereby an initial setting of rolls for one of the packs will serve for all of them.

10. That process of rolling sheet metal which consists in rolling thin plate sections by continuous process, forming packs therefrom having a known cross section of which the next roller is advised, heating said packs and finally hot rolling the packs.

11. That process of rolling sheet metal which consists in rolling individual plate sections of equal bulk to form single pieces of substantially equal bulk, in which gauge variation is accompanied by length variation, and from these pieces by selection and superposition of pieces of substantially equal length, forming packs of a known cross section of which the next roller is advised, and finally hot rolling said packs.

12. That process of rolling sheet metal which comprises rolling plate sections by continuous process in single thicknesses, said plate sections being of substantially equal bulk, and from the rolled sections formed thereby, producing packs by the selection and superposition of substantially equal length rolled sections, whereby the roller is advised by the cross section of said packs, and finally heating and hot rolling said packs.

JOHN B. TYTUS.